United States Patent [19]
Keller et al.

[11] Patent Number: 5,255,943
[45] Date of Patent: Oct. 26, 1993

[54] WELDING SLEEVE AND METHOD FOR ITS MANUFACTURE

[75] Inventors: Friedhelm Keller, Donaueschingen, Fed. Rep. of Germany; Dirk Petry, Feuerthalen; Helmut Hilger, Beringen, both of Switzerland

[73] Assignee: Georg Fischer Rohrleitungssysteme AG, Schaffhausen, Switzerland

[21] Appl. No.: 883,826

[22] Filed: May 15, 1992

[30] Foreign Application Priority Data

Feb. 8, 1992 [DE] Fed. Rep. of Germany ....... 4203626

[51] Int. Cl.⁵ .............................................. F16L 13/02
[52] U.S. Cl. ...................................... 285/21; 285/381; 219/535; 156/274.2
[58] Field of Search ........................... 285/21, 22, 381; 219/535, 544; 156/379.7, 273.9, 274.2

[56] References Cited
U.S. PATENT DOCUMENTS

| | | | |
|---|---|---|---|
| 2,001,204 | 5/1935 | Long et al. | 285/381 |
| 2,121,035 | 6/1938 | Hollister et al. | 285/381 X |
| 3,506,519 | 4/1970 | Blumenkranz | 156/274.2 |
| 3,943,334 | 3/1976 | Sturm | 285/21 X |
| 4,035,534 | 7/1977 | Nyberg | 285/381 X |
| 4,266,997 | 5/1981 | Lippera | 156/274.2 X |
| 4,424,991 | 1/1984 | Hill et al. | 285/381 |
| 4,727,242 | 2/1988 | Barfield | 285/21 X |

*Primary Examiner*—Dave W. Arola
*Attorney, Agent, or Firm*—Anderson Kill Olick & Oshinsky

[57] ABSTRACT

A welding sleeve is disclosed comprising a sleeve member of thermoplastic weldable material having a resistor wire winding at the internal surface thereof. A reinforcement ring of thermoplastic material is frictionally connected with the external circumference of the sleeve member

5 Claims, 1 Drawing Sheet

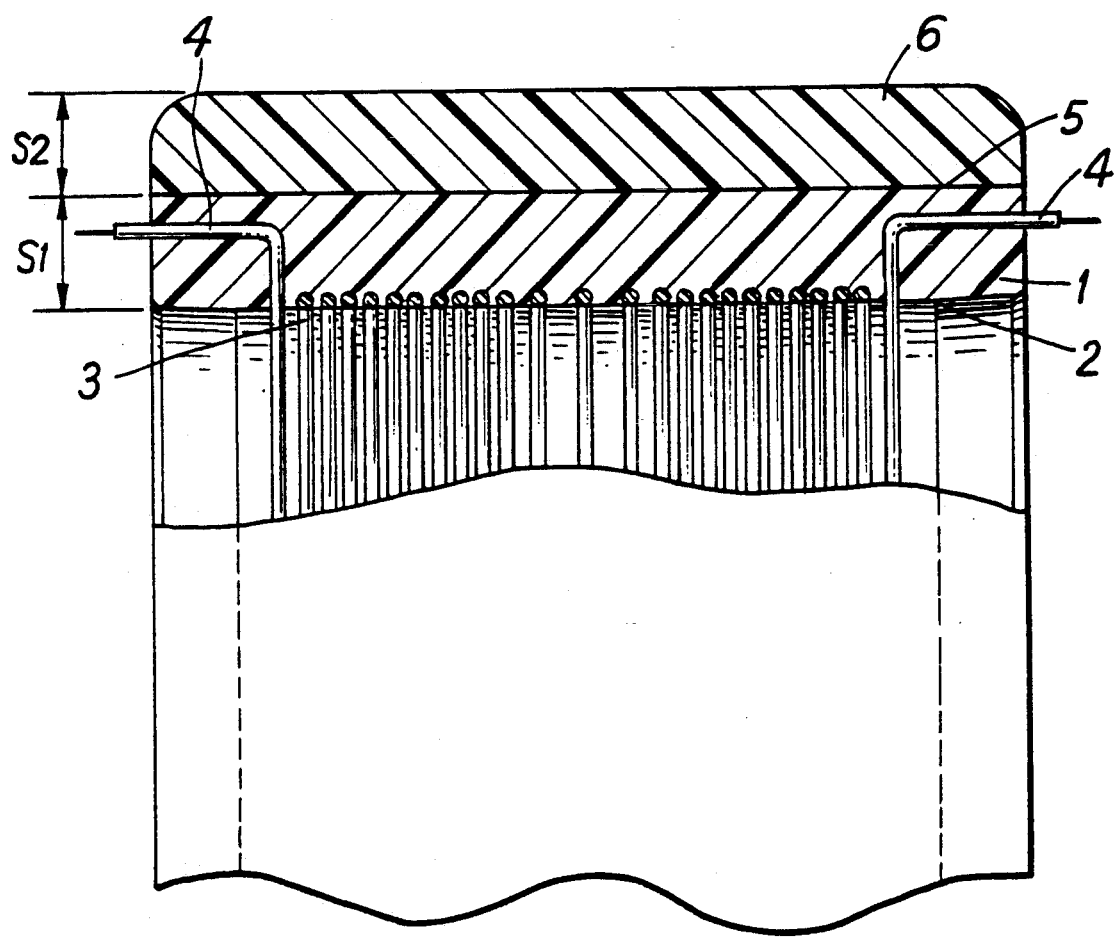

WELDING SLEEVE AND METHOD FOR ITS MANUFACTURE

FIELD OF THE INVENTION

The present invention is directed to a welding sleeve or socket and a method for manufacture of the welding sleeve.

BACKGROUND OF THE INVENTION

Commercially available pipes have, in part, wide tolerances and considerable ovalness. This requires the internal diameter of the sleeve to be designed to be very large. Also, in order to be easily installable, additional large thermal extensions or strains occur in electrically welded sleeves having a large diameter, resulting in pressure degradation in the welding zone.

A welding sleeve is disclosed in EP-A1 022 2287 in which reinforcement from a material having a lower coefficient of thermal expansion than the sleeve member of a polyolefin helps save welding sleeve material in the sleeve body. The welding pressure required for a satisfactory weld is obtained by a smaller elongation or extension of the reinforcement during the welding process.

The coefficients of thermal expansion, however, vary between the sleeve member and the reinforcement according to differing environmental temperatures during the course of welding, resulting in differing prestresses. For example, one obtains a different welding pressure at +45° C. than at −10° C. Constant operability therefore cannot be assured. The reinforcement configured as a pipe-shaped member or as a wire winding or coil is additionally not resistant against corrosion and does not therefore provide for the lasting reinforcement of the welding sleeve acting also against the medium pressure.

To overcome these and other disadvantages with previous welding sleeves, it is an object of the invention to provide an economical welding sleeve which permits a constant operability at varying environmental temperatures during welding.

Another object of the invention is to provide a welding sleeve usable for larger pipe diameters exceeding, for example, 160 mm and which is not prone to corrosion.

Yet another object of the invention is to provide a method of manufacturing a welding sleeve in a simple, automatic method.

SUMMARY OF THE INVENTION

These and other objects of the invention, which shall be apparent hereafter, are achieved by the disclosed welding sleeve and method for its manufacture, comprising a welding sleeve having a sleeve member made from a thermoplastic material. The internal surface of the sleeve member includes a resistor wire winding and the external circumference includes a reinforcement ring. The reinforcement ring is pressed onto the external circumference of the sleeve and has circumferential stresses because of the widening. These stresses act radially upon the sleeve member and increase the welding pressure required for a good welded connection.

BRIEF DESCRIPTION OF THE DRAWING

The invention will be better understood by the detailed description of its preferred embodiments with reference to the drawing of which the sole figure depicts a partial, longitudinal cross-sectional view through a welding sleeve.

DETAILED DESCRIPTION OF THE PREFERRED EMBODIMENTS

The figure depicts a welding sleeve for rigidly pipe-shaped parts or pipes with a sleeve member 1 made preferably of a thermoplastic, weldable material. A resistor wire winding 3 is arranged at the inner surface 2 of the sleeve and comprises, for example, junction wires 4 or plug-in connections for connection to a current source.

A reinforcement ring 6, arranged at the external circumference 5 of the sleeve member 1, is connected to the sleeve member 1 in a frictionally adhesive manner by being shrunk-on or pressed on. The reinforcement ring 6 is also made of thermoplastic material, preferably from a polyolefin such as polyethylene. If the reinforcement ring 6 is heated prior to being pressed around the sleeve 1 and thereafter rapidly cooled, additional shrinkage stresses are frozen, which remain in existence up to the welding process with the pipe parts and are then available in their entirety for producing the welding pressure. The reinforcement ring 6 is pressed onto the sleeve member 2 in mounting the reinforcement ring 6 onto the sleeve member 1. The sleeve member 1 is already provided with a resistor wire winding 3.

It may be necessary or advantageous to heat the reinforcement ring 6 to a temperature above that of the sleeve member, depending upon the material used and the diameter. By using the thermoplastic material at the outer circumference of the sleeve member 1 by frictional connection, there arises an inwardly oriented pressure because of the existing stresses during welding. The inwardly oriented pressure acts upon the melted material, creating the welding pressure required for a good welded connection. Since the coefficient of thermal expansion of the reinforcement ring 6 corresponds largely to that of the sleeve member 1, equal welding pressure conditions are assured at all environmental temperatures. During the welding process the frozen stresses are released by the heating and act as radial pressure forces upon the sleeve member and the melted material.

The external diameter D of the sleeve member 1 is slightly greater than the internal diameter of the possibly heated reinforcement ring 6, whereupon the ring 6 is widened by the widening dimension. The widening process introduces stresses extending in a circumferential direction of the reinforcement ring 6, which, as a radial pressure force, increases the welding pressure during the welding process. By selected heating temperature of the reinforcement ring 6, it is possible to utilize the dimensional change of the reinforcement ring 6 when cooling for the stress buildup, wherein a combined pressing-shrinkage fit is produced.

Because of the melted material in the welding zone, the stiffness of the sleeve member 1 is additionally reduced whereby the radial pressure forces are also increased. This increases the welding pressure and additionally assures a solid, welded connection with larger pipe tolerances.

By selecting the widening dimension, the chosen wall thicknesses of the reinforcement ring and possibly its heating temperature, the desired stresses or the required welding pressure can also be achieved whereby an optimum layout of the welding sleeve is achievable.

The wall thickness S2 of the reinforcement ring 6 should advantageously be smaller or slightly larger than the wall thickness S1 of the sleeve member 1. Small wall thicknesses are advantageous for the saving of material.

While the preferred embodiment of the present invention has been presented in detail, modifications and adaptions thereof may be undertaken without departing from the spirit and scope of the invention as defined in the following claims:

What is claimed is:

1. A welding sleeve, comprising:
   a sleeve member formed of a thermoplastic weldable material and having internal and external surfaces;
   a resistor wire winding provided at the internal surface of the sleeve member; and
   a reinforcement ring having an inner diameter smaller than the diameter of said external surface of said sleeve member and formed of a thermoplastic material and force lockingly connected with the external surface of the sleeve member by a press fit.

2. The welding sleeve of claim 1 wherein said sleeve member and said reinforcing ring are formed of a same thermoplastic material.

3. The welding sleeve of claim 2, wherein said thermoplastic material is polyolefic.

4. A method of manufacturing a welding sleeve, comprising the steps of:
   manufacturing a sleeve member from a thermoplastic material;
   providing a resistor winding at an internal surface of the sleeve member;
   manufacturing a reinforcement ring having an inner diameter which is smaller than the external diameter of the sleeve member; and
   pressing the reinforcement ring upon the sleeve member, wherein the reinforcement ring is force-lockingly connected with the sleeve member and circumferential stresses, which results from expansion of the circumferential ring, act radially on the sleeve member.

5. The method of claim 4, further comprising the steps of:
   heating the reinforcement ring prior to pressing it onto the sleeve member; and
   rapidly cooling the reinforcement ring after it has been pressed onto the sleeve member.

* * * * *